United States Patent

Suzuki

[11] Patent Number: 5,891,591
[45] Date of Patent: Apr. 6, 1999

[54] BATTERY TERMINAL

[75] Inventor: Masao Suzuki, Tokyo, Japan

[73] Assignee: Thomas & Betts Corporation, Memphis, Tenn.

[21] Appl. No.: 851,649

[22] Filed: May 6, 1997

[51] Int. Cl.$^6$ .................................................... H01M 2/30
[52] U.S. Cl. ............................ 429/178; 439/357; 439/717
[58] Field of Search .................................. 429/178, 179, 429/121; 439/717, 354, 357, 715, 884

[56] References Cited

U.S. PATENT DOCUMENTS

| | | | |
|---|---|---|---|
| 4,074,928 | 2/1978 | Johnston | 439/354 X |
| 4,400,051 | 8/1983 | Stenz | 439/717 |
| 5,062,024 | 10/1991 | Hennemann | 439/717 X |
| 5,230,636 | 7/1993 | Masuda et al. | 439/354 X |
| 5,582,933 | 12/1996 | Daio et al. | 429/178 |

*Primary Examiner*—Anthony Skapars
*Attorney, Agent, or Firm*—Hoffman & Baron, LLP

[57] ABSTRACT

The battery terminal comprises a housing, cavities provided in the housing at predetermined internals, and a plurality of contacts mounted in the cavities, respectively. A free and triangular contact portion is provided at one end of each of the contact. The contact portion is extended outward from a surface of the housing.

5 Claims, 2 Drawing Sheets

BATTERY TERMINAL

FIELD OF THE INVENTION

The present invention relates to an electrical connector, particularly to a battery connector and, more particularly, to a surface mounting terminal that enables contact with electrode of a battery without being limited by the inserting direction of the battery.

BACKGROUND OF THE INVENTION

In accordance with the trend for a compact, multifunctional electronic equipment, e.g., a mobile telephone and a portable personal computer, the number of types of batteries used for such an electronic equipment is increased. Regarding a connector (a battery terminal) used for electrically connecting the electronic equipment to the battery, many types of the batteries. For example, for a battery having an electrode parallel to the inserting direction of the battery (battery having an electrode that comes in slidable contact with the battery terminal) and a battery having an electrode intersecting the inserting direction of the battery (battery having an electrode that abuts against the battery connector to come in contact with it), terminals having different structures are used.

SUMMARY OF THE INVENTION

To use terminals having different structures in accordance with the types of the batteries is inconvenient in terms of the costs and component management. A battery terminal that can be used as commonly as possible regardless of the types of the batteries is desirable.

For a small-sized battery, a terminal capable of coming in reliable contact with the battery electrode and having a small size (a low profile depending on the location where the battery is used) is required. Hence, as a surface mounting terminal, one having a low profile and satisfying the demand described above has been sought for.

A battery terminal according to the present invention is developed in order to satisfy the demands described above and comprises, e.g., a housing having cavities provided at predetermined internals, and a plurality of contacts mounted in the cavities, wherein a substantially triangular contact portion having a free distal end projects from the surface of the housing. Each of the contacts is constituted by a movable actuator portion having the contact portion, a base portion having a latch portion to be fixed in the corresponding cavity of the housing, and a link portion for linking the base portion and the actuator portion.

BRIEF DESCRIPTION OF THE DRAWING FIGURES

DETAILED DESCRIPTION OF THE PREFERRED EMBODIMENT(S)

Figure 1:
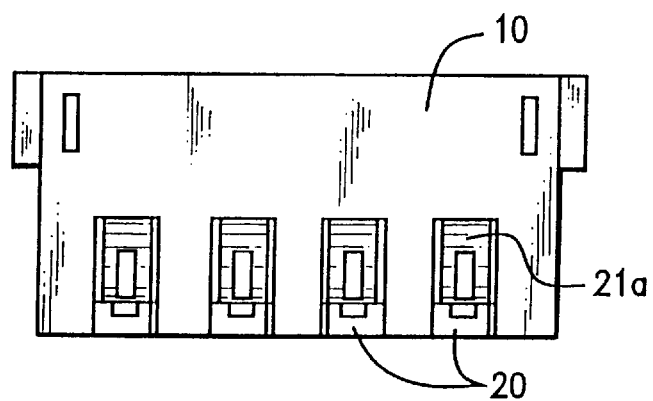
FIG. 1 is a plane view showing an embodiment according to the present invention.
Figure 2:
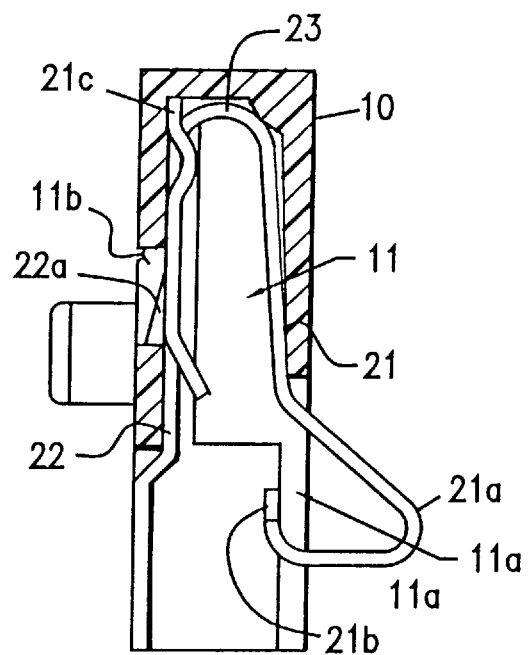
FIG. 2 is a sectional view showing the embodiment as shown in FIG. 1.
Figure 3:
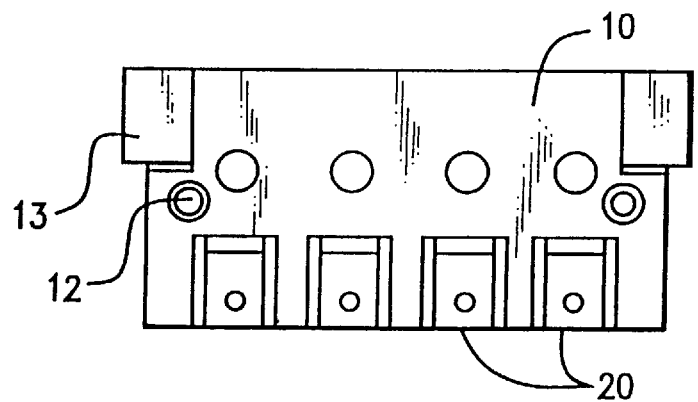
FIG. 3 is a bottom view showing the embodiment as shown in FIG. 1.

FIGS. 1 to 3 show a battery terminal, in particular a surface mounting terminal, according to an embodiment of the present invention. Referring to FIGS. 1 to 3, reference numeral 10 denotes a housing made of, e.g., a glass-reinforced LPC resin. As shown in FIG. 2, cavities 11 for mounting contacts 20 therein are formed in this housing at predetermined intervals. In order to allow substantially triangular contact portions 21a of the contacts to project from the surface of the housing, notches 11a are formed in the housing at portions corresponding to the contact portions.

Figure 4:
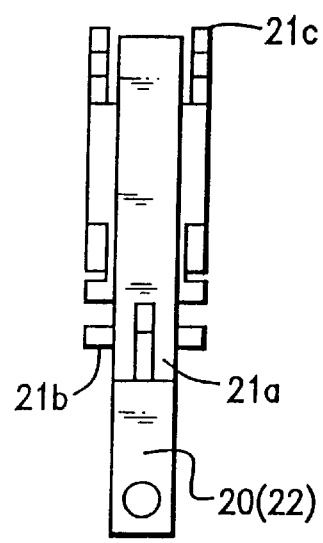
FIG. 4 is a plan view showing a contact according to the present invention.

As is apparent from FIGS. 2 and 4, each of the contacts 20 is constituted by a movable actuator portion 21 having the contact portion 21a, a base portion 22 having a latch portion 22a to be fixed in the corresponding cavity of the housing, and a link portion 23 for linking the base portion and the actuator portion. As shown in FIG. 2, the contact portion 21a of each actuator portion actuates about the bent portion of the link portion as the fulcrum so that it can retract in the cavity.

Referring to FIG. 3, reference numeral 12 denotes a projection serving as a guide when mounting the connector of the present invention on the surface of a printed circuit board; and 13, a reinforcing plate. Both the projection 12 and the reinforcing plate 13 are provided as required.

As shown in FIG. 4, the substantially triangular contact portion 21a of each contact has a pair of engaging portions 21b extending outward on its distal end. After the actuator portion of the contact is preloaded, the engaging portions are engaged inside the edge of the opening of the notch 11a of the cavity.

In the embodiment shown in FIGS. 1 to 4, the substantially triangular contact portion 21a of each contact is formed with a slope on the link portion side of the contact in order to accept the electrode of a battery inserted from the link portion side of the contact.

Furthermore, the contact portion of each contact has a distal end which is open (not closed), and is accommodated in the cavity as it is preloaded, as described above. Thus, a low-profile terminal capable of accepting the same load as that accepted by a conventional terminal, or a terminal whose distal end moves larger than a conventional terminal even with the same stroke, can be obtained.

In this embodiment, a pair of leg portions (upright portions) 21c extend on the link portion side of the base portion of the contact, as shown in FIG. 4. These leg portions 21c fix the contact accommodated in the cavity more reliably (to prevent backlash).

In this embodiment, a space that can be drawn by the nozzle of an automatic mounter by suction can be maintained at the central portion of the upper surface of the housing.

A case wherein the present invention is applied to a battery terminal has been described. It is a matter of course that the present invention can similarly be applied to other electrical connectors as far as the arrangements of their contact portions have the same arrangement as that of the present invention.

In the battery terminal according to the present invention, each of the contacts mounted on the housing has the substantially triangular contact portion 21a with a free distal end, to project from the surface of the housing. Therefore, even when the battery is inserted to slide on the contact, or even when the battery is inserted to abut against the contact, it reliably comes in contact with the battery electrode, thus achieving electrical connection.

Since the substantially triangular contact portion of the contact has a distal end which is open-(not closed), and can be accommodated in the cavity as it is preloaded, a low-profile terminal capable of accepting the same load as that accepted by a conventional terminal, or a terminal whose distal end moves larger than a conventional terminal even with the same stroke, can be provided.

What is claimed is:

1. A battery terminal comprising:

an insulative housing 10; said housing including a plurality of cavities 11; and a plurality of electrical contacts 20 mounted in said cavities of said housing;

each of said contacts including a base section 22 supported by said housing, a movable actuator section 21 and a link section 23 between said base section and said movable actuator section for permitting resilient movement of said movable actuator section with respect to said base section;

each of said contacts further including a contact portion 21*a* at an end of said movable actuator section and extending externally of said housing for resilient engagement with a battery movable with respect to said housing in both a sliding and abutting direction.

2. A battery terminal according to claim 1, wherein each of said contacts includes a link section 23 provided between said actuator section and said base section.

3. A battery terminal according to claim 1 or 2, wherein a notch 11*a* is provided in said cavity at a position corresponding to the contact portion 21*a*.

4. A battery terminal according to claim 3, wherein engaging portions 21*b* are provided at said contact portion 21*a*, said engaging portions 21*b* being extended outward from one end of said contact portion, said engaging portions arranged to be engaged at an edge of an opening of the notch 11*a* of said cavity.

5. A battery terminal according to claim 3 or 4, wherein the latch portion 22*a* provided at the base section 22 of said contact is a lanced-shaped protrusion, said latch portion being latched with a latch groove 11*b* provided in said cavity at a position corresponding to said latch portion.

* * * * *